(No Model.)
R. BLOESER.
JAR FASTENER.
No. 370,676.　　　　　Patented Sept. 27, 1887.
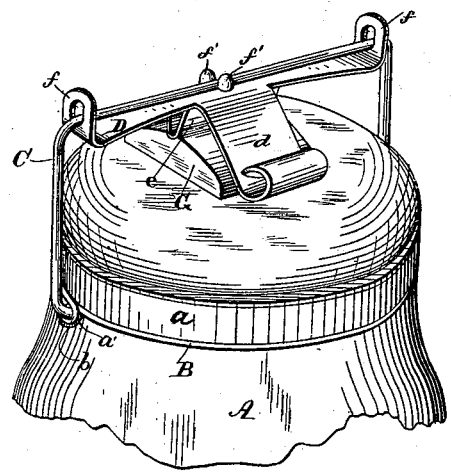
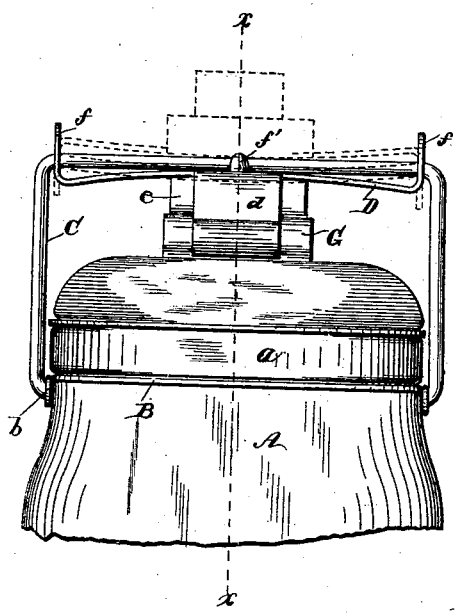
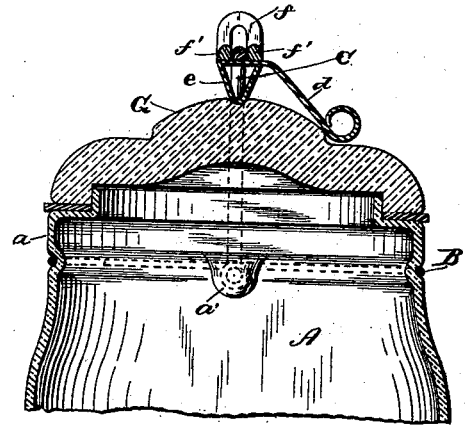

UNITED STATES PATENT OFFICE.

RUDOLPH BLOESER, OF SCRANTON, PENNSYLVANIA.

JAR-FASTENER.

SPECIFICATION forming part of Letters Patent No. 370,676, dated September 27, 1887.

Application filed August 12, 1887. Serial No. 246,786. (No model.)

*To all whom it may concern:*

Be it known that I, RUDOLPH BLOESER, of Scranton, in the county of Lackawanna and State of Pennsylvania, have invented certain new and useful Improvements in Jar-Fasteners; and I do hereby declare the following to be a full, clear, and exact description of the same, reference being had to the accompanying drawings, forming a part of this specification, and to the figures and letters of reference marked thereon.

The present invention relates to certain improvements in fasteners for the covers of fruit-jars or similar articles, and has for its object to simplify their construction and render them more efficient than those at present in use; and to this end the invention consists in certain novel details of construction and combinations of parts, to be hereinafter described, and pointed out particularly in the claims at the end of this specification.

Referring to the accompanying drawings, Figure 1 is a perspective view of a jar having my fastener applied thereto. Fig. 2 is a side elevation showing the lever down in full lines and up in dotted lines. Fig. 3 is a cross-section on the line $x$ $x$, Fig. 2.

Similar letters of reference in the several figures indicate the same parts.

The glass jar A is provided with the usual collar, $a$, around its mouth, and preferably with two depressions, $a'$, one at each side, over which are located loops, ears, or coils $b$ of the wire B, passing around the jar beneath the collar. The bail C has its ends turned in for engaging the loops or ears $b$ over the said depressions, the upper portion of the bail being bent at right angles on each side and the portion passing across the top preferably curved slightly downward in the center a sufficient distance to give the requisite spring and pressure on the jar-top, as will be presently explained. (See dotted lines, Fig. 2.)

The locking-lever D is preferably formed of a single piece of sheet metal, with the handle $d$ appropriately shaped and the tongue $e$ bent downward into V shape for engaging the jar-top, all as shown clearly in Fig. 3. The arms $f$, extending out from the sides of the lever, are preferably turned up at the ends, and have slots therein through which the bail passes, they being of such shape and length as that the sides of the slots will engage the bail at a point near the bends in the same. It will thus be seen that the lever is held securely on the bail, side motion of either with relation to the other being prevented at the center by the two projections or lugs $f'$ and at the ends by the sides of the aforesaid slots.

The jar-top is usually of glass, and has a raised portion, G, at the center, with a slight depression or groove in its top for the accommodation of the V-point of the locking-lever when the latter is turned down into position for clamping it.

As before stated, the portion of the bail passing across the top of the jar is depressed or curved downward at the center, as shown in dotted lines, Fig. 2. This is for the purpose of allowing the bail to bear on the locking-lever only at the center when it is in clamped position, the slots in the arms permitting a slight motion of the lever at the sides. The same result may be accomplished by depressing the ends of the locking-lever and leaving the bail straight, as shown in full lines in said figure.

In releasing the top by pressing on the sides of the bail, as is ordinarily done, it will be seen that the bail does not bend in the middle; but the arms $f$, taking up the strain, cause the lever to respond at once to the pressure. This would not be the case were the lever applied, as ordinarily, to approximately the center of the bail.

I provide the two projections or lugs, one on each side of the bail at the center, in order to prevent the bail slipping off or bending sidewise at this point when the pressure is brought to bear in throwing the lever into locked position.

Having thus described my invention, what I claim as new is—

1. The combination, with the bail passing over the top of the jar, of the locking-lever having the extended arms embracing the bail at either side, said bail bearing only at the center of the locking-lever when in locked position, substantially as described.

2. The combination, with the bail passing across the top of the jar and curved slightly downward at the center, of the locking-lever having the extended arms engaging the bail at either side and taking its bearing only at the center of the bail when locked, substantially as described.

3. The combination, with the bail passing across the top of the jar, of the locking-lever having the extended arms embracing the bail at their ends and taking its bearing only at the center of the bail when locked, and the two projections on said lever for holding the bail thereon at said central point, substantially as described.

4. The combination, with the bail passing across the top of the jar, of a sheet-metal locking-lever therefor, having the extended arms engaging the bail at either side, the handle for operating the lever, and the downwardly-projecting portion for engaging the jar-top, substantially as described.

RUDOLPH BLOESER.

Witnesses:
A. D. DEAN,
O. CARPENTER.